US012612787B2

(12) United States Patent
Nuyts et al.

(10) Patent No.: US 12,612,787 B2
(45) Date of Patent: Apr. 28, 2026

(54) DECORATIVE PANEL AND METHOD FOR MANUFACTURING DECORATIVE PANELS

(71) Applicant: Flooring Industries Limited, SARL, Bertrange (LU)

(72) Inventors: Joren Nuyts, Wielsbeke (BE); Sara Vanhaverbeke, Wielsbeke (BE); Kristof Van Vlassenrode, Wielsbeke (BE); Ximing Deng, Wielsbeke (BE)

(73) Assignee: UNILIN, BV, Wielsbeke (BE)

(*) Notice: Subject to any disclaimer, the term of this patent is extended or adjusted under 35 U.S.C. 154(b) by 63 days.

(21) Appl. No.: 18/500,334

(22) Filed: Nov. 2, 2023

(65) Prior Publication Data

US 2024/0151045 A1 May 9, 2024

Related U.S. Application Data

(60) Provisional application No. 63/422,296, filed on Nov. 3, 2022.

(51) Int. Cl.

| | |
|---|---|
| ***B32B 3/10*** | (2006.01) |
| ***B44C 5/04*** | (2006.01) |
| ***E04F 13/08*** | (2006.01) |

(52) U.S. Cl.

CPC ............ *E04F 13/0871* (2013.01); *B44C 5/04* (2013.01); *E04F 13/0866* (2013.01)

(58) Field of Classification Search

None

See application file for complete search history.

(56) References Cited

U.S. PATENT DOCUMENTS

| | | | | |
|---|---|---|---|---|
| 4,953,335 | A | 9/1990 | Kawaguchi et al. | |
| 5,755,068 | A | 5/1998 | Ormiston | |
| 6,786,019 | B2 | 9/2004 | Thiers | |
| 11,643,823 | B2 * | 5/2023 | D'Hondt ........... | E04F 15/02038 428/192 |
| 12,180,720 | B2 | 12/2024 | Van Vlassenrode et al. | |
| 2006/0130421 | A1 | 6/2006 | Nollet et al. | |
| 2007/0036901 | A1 | 2/2007 | Sjoberg | |
| 2009/0260313 | A1 | 10/2009 | Segaert | |
| 2011/0200750 | A1 | 8/2011 | Meersseman et al. | |
| 2013/0269863 | A1 * | 10/2013 | Pervan .................. | B44C 5/0476 156/279 |

FOREIGN PATENT DOCUMENTS

| | | |
|---|---|---|
| DE | 9202976 U1 | 5/1992 |
| EP | 1812172 A1 | 8/2007 |

(Continued)

OTHER PUBLICATIONS

Machine translation of JP-2011202422-A (Year: 2011).*

(Continued)

*Primary Examiner* — Christopher M Polley
(74) *Attorney, Agent, or Firm* — Workman Nydegger

(57) ABSTRACT

Decorative panel comprising a substrate and a top layer, wherein said top layer optionally is provided with a main surface top coating provided thereon and said decorative panel at at least one upper edge is provided with a lowered edge region, wherein at least a portion of said lowered edge region is provided with a lowered edge top coating, wherein said lowered edge top coating is transparent or translucent.

13 Claims, 6 Drawing Sheets

(56) References Cited

FOREIGN PATENT DOCUMENTS

| | | | | | |
|---|---|---|---|---|---|
| EP | 2113393 | A1 | | 11/2009 | |
| EP | 2099873 | B1 | | 11/2015 | |
| EP | 3115195 | A1 | * | 1/2017 | ............ E04F 15/107 |
| EP | 4001546 | A1 | | 5/2022 | |
| EP | 4015736 | A1 | * | 6/2022 | ............. B32B 21/02 |
| JP | 2011202422 | A | * | 10/2011 | |
| JP | 4839541 | B2 | * | 12/2011 | |
| WO | 9747834 | A1 | | 12/1997 | |
| WO | 2004042168 | A1 | | 5/2004 | |
| WO | 2013026559 | A2 | | 2/2013 | |

OTHER PUBLICATIONS

Machine translation of JP-4839541-B2 (Year: 2011).*
Extended European Search Report from Corresponding European Patent Application No. EP23206686.0, Mar. 12, 2024.

* cited by examiner

DECORATIVE PANEL AND METHOD FOR MANUFACTURING DECORATIVE PANELS

BACKGROUND

The present invention relates to decorative panels and methods for manufacturing decorative panels. The decorative panels of the invention are in the first place destined for application as floating floor panels, but may also be applied otherwise. For example as glued down floor panels, or as wall or ceiling panels.

In particular, the invention relates to decorative panels, for which laminate floor panels, parquet floor panels, and floor panels based on synthetic material are known examples. More in particular, in the class of floor panels which are based on synthetic material, LVT, WPC, and SPC floor panels are known examples. These floor panels mostly have a thermoplastic substrate, which, apart from the thermoplastic synthetic material, may also comprise additives and/or fillers. The top layer of these floor panels mostly also is composed of one or more thermoplastic layers. Reference is made to document WO 2013/026559 for an exemplary composition of such product.

Similarly to laminate floor panels, it is the intention that these synthetic material-based floor panels comprise an upper surface reflecting a natural character. To this aim, use is generally made of a decor and an embossed wear layer, by which a relief is realized in the upper surface of the floor panel. Again, reference is made to document WO 2013/026559, in which such example is described.

Decorative panels as known in the art, may however have the disadvantage of still having a substantially synthetic look and/or feel. While advances have already been made with regard to the quality of the decorative print, the embossed structure still leaves a lot to desire in light of providing a more natural feel.

SUMMARY

The prime object of the present invention is to provide an alternative decorative panel, with various preferred embodiments offering a solution for the problems associated with the decorative panels of the state of the art.

To this aim, a first independent aspect of the present invention is a decorative panel comprising a substrate, a top layer and a top coating, wherein said top layer is located between said substrate and said top coating, wherein the uppermost surface of the top layer preferably comprises a relief, and wherein said top coating comprises a coating material and a texturizing agent. In light of the present invention, the term "texturizing agent" is to be interpreted as a material which may provide the decorative panel with a particular texture and/or feel.

According to the invention, a decorative panel is thus obtained with a particular feel and/or visual appearance on its uppermost surface. Preferably, the texturizing agent in the top coating is combined with the relief in the top layer, which further enhances the particular feel and/or visual appearance of the uppermost surface of the decorative panel. More specifically, the uppermost surface of the decorative panel may have a feel which corresponds to being dry, chalky, dusty, sandy, grainy, or a combination thereof. The decorative panel of the invention may thus provide for a more authentic and/or more natural feel, especially with regard to decorative panels imitating materials such as natural stone, limestone, sandstone, concrete or cement. This particular feel may be noticeable in an installed state, for example when touching a wall panel, or when walking on a floor panel. Additionally, this particular feel may also be noticeable even before the decorative panel is installed, for example on a sample in a shop. The decorative panel of the invention may thus not only have a more authentic and/or more natural feel, but may also have a higher perceived quality before installing and/or using the decorative panel, for example during the buying process.

In particular, the texturizing agent may have a clearly distinct property from the coating material. The texturizing agent and the coating material may for example both be liquid materials, and may preferably have a distinct property in that they have a different viscosity, a different composition, or the like. Alternatively, the texturizing agent may for example be a solid material and the coating material may be a liquid material. Preferably, the texturizing agent may be a granular material, which may be suspended in the liquid coating material. According to another alternative, the texturizing agent and the coating material may for example both be solid materials, and may preferably have a distinct property in that they have a different hardness, a different particle size, a different geometry, a different composition, or the like.

In those embodiments wherein the top layer comprises a relief, said relief may be visible through the top coating. The surface of the top coating may itself be flat, wherein the relief of the top layer is visible through the top coating. Herein, the relief of the top layer may not contribute to the feel of the decorative panel, but may however contribute to a particular visual appearance. Alternatively, the top coating may follow the relief of the top layer, wherein the relief may thus contribute to both a particular feel as well as a particular visual appearance.

According to some alternative embodiments, no relief may be present on the uppermost surface of the top layer. Herein, only the texturizing agent contributes to the particular feel and/or visual appearance of the decorative panel.

According to some embodiments, said texturizing agent forms a primary microrelief in the top coating. Although the texturizing agent may be permanently fixed within the coating material, a particular dry, chalky, dusty, sandy or grainy feel may be obtained through the microrelief of the top coating, thereby creating the illusion that small particles are being released from the surface of the decorative panel. More in particular, the relief of the top layer and the first microrelief of the top coating in combination may provide the decorative panel with a convincing feel which is similar to natural stone, limestone, sandstone, concrete or cement.

According to some embodiments, said texturizing agent provides for a matting effect. For example said top coating has a degree of gloss of 10 or less, or 5 or less, or 2 or less as defined in DIN 67530. In such case the texturizing agent may comprise:

- particles of silica, preferably amorphous silica and/or precipitated silica, preferably having a surface BET of 200 to 500 $m^2/g$ and/or a median particle size as defined by the D50 value of 1 to 30 μm, preferably of 3 to 10 μm; and/or
- a wax based on polyethylene, polypropylene, carnauba, polytetrafluoroethylene or amide.

According to a further or another embodiment, said texturizing agent comprises a micro-granulate which has a median particle diameter D50 of between 1 and 30 μm.

In general, it is remarked that, wherever median particle diameter D50 values are described herein, the median particle diameter D50 may be determined using laser granulometry, which may be performed in accordance with ISO 13320:2020. This is a dynamic light scattering technique using a laser with an emission wavelength of 632.8 nm, measuring at a scattering angle of 90 degrees. This technique may be performed, for example, with a Malvern® Mastersizer 2000 or with a Malvern® Mastersizer 3000. To perform the measurement of the particle size distribution, the respective particles need to be brought in a loose state, and can be dispersed in a liquid, such as water. In such a state wherein the micro-granulate is fixed within and/or onto the top coating of the decorative panel, the median particle diameter D50 may be determined using confocal microscopy. More in particular, ISO 25178-2:2021 may be used to determine an array of surface texture parameters describe therein. The median particle diameter D50 may be measured and/or derived directly from the confocal microscopy images.

It was found that using a micro-granulate with a median particle diameter D50 of between 1 and 30 μm was optimally suited to convincingly imitate the feeling of natural stone, limestone, sandstone, concrete or cement, thus substantially improving the perceived quality of the decorative panel. Herein, smaller diameters of for example 1 μm may be better suited create the illusion of finer materials, such as concrete or chalkstone, while larger diameters of for example 30 μm may be better suited to create the illusion of coarser materials, such as sandstone.

By preference, said micro-granulate has a median particle diameter D50 of between 1 and 20 μm. More by preference, said micro-granulate has a median particle diameter D50 of between 1 and 10 μm. Even more by preference, said micro-granulate has a median particle diameter D50 of between 1 and 5 μm, such as between 3 and 5 μm. With increasing preference, the diameter range as described herein may create the illusion that small particles are being released from the surface of the decorative panel, thus creating more convincingly a chalky, dusty, sandy or grainy feel.

According to a particular embodiment, said micro-granulate comprises a micronized polymer composition. Using a micronized polymer composition may have the advantage that the micro-granulate has an exceptionally accurate particle size distribution. By preference, said micronized polymer composition is chosen from the group of polypropylene wax, polyethylene wax, polytetrafluoroethylene-modified polyethylene wax (PTFE-modified polyethylene wax), modified high-density polyethylene wax (modified HD polyethylene wax), urea aldehyde resin, amide wax, polytetrafluoroethylene (PTFE), amide-modified polyethylene wax, polyester, or combinations thereof. More by preference, said micronized polymer composition is polypropylene wax.

According to a further or another embodiment, said coating material comprises a UV-curable lacquer. By preference, said UV-curable lacquer is a polyurethane acrylate (PU acrylate) based lacquer. It may also be possible that said coating material comprises one or more silane coupling agents. Herein, the silane coupling agents may improve fixation of the texturizing agent in the coating material, for example by means of cross-linking, and may thus aid in conserving the particular feel and/or visual appearance of the decorative panel.

According to some embodiments, said micro-granulate is present in an amount of between 1 and 10 vol % with respect to the top coating. More by preference, said micro-granulate is present in an amount of between 2 and 8 vol %, even more by preference of between 4 and 6 vol % with respect to the top coating.

According to some embodiments, said top coating has an average thickness of between 10 and 50 μm. By preference, said top coating has an average thickness of between 10 and 40 μm. More by preference, said top coating has an average thickness of between 10 and 30 μm. Even more by preference, said top coating has an average thickness of between 10 and 20 μm, such as between 10 and 15 μm.

According to a further or another embodiment, the relief of the top layer comprises a secondary microrelief, which secondary microrelief defines a plurality of texture elements, wherein the smallest sphere circumscribing one of said texture elements has an average diameter of between 5 and 100 μm. In the light of the present invention, the term "texture element" may be interpreted as a singular protrusion emerging from the surface of the top layer.

As such a singular protrusion may be either regular or irregular in shape, a suitable measurement of such a texture element is the average diameter of the smallest circumscribing sphere. It is noted that, the average diameter of the smallest circumscribing sphere may be determined using confocal microscopy. More in particular, ISO 25178-2:2021 may be used to determine an array of surface texture parameters describe therein. The average diameter of the smallest circumscribing sphere may be measured and/or derived directly from the confocal microscopy images.

The combination of the secondary microrelief as described herein and the texturizing agent, which preferably defines a primary microrelief, may thus result in a further improvement of the particular feel and/or visual appearance of the uppermost surface of the decorative panel. More specifically, the uppermost surface of the decorative panel may have an improved feel which corresponds to being dry, chalky, dusty, sandy, grainy, or a combination thereof. Herein, the rougher structure of aforementioned materials may be largely obtained as a result of the secondary microrelief, and the illusion that small particles are being released from the surface of the decorative panel may be largely obtained as a result of the texturizing agent, preferably defining said primary microrelief.

By preference, the smallest sphere circumscribing one of said texture elements has an average diameter of between 5 and 75 μm. More by preference, the smallest sphere circumscribing one of said texture elements has an average diameter of between 5 and 50 μm. Even more by preference, the smallest sphere circumscribing one of said texture elements has an average diameter of between 5 and 25 μm, such as between 5 and 20 μm, or even such as between 10 and 15 μm.

According to some embodiments, the relief of the top layer may also define a macrorelief. Preferably, said macrorelief may correspond to the texture of a natural material such as natural stone or wood.

According to some embodiments, the relief of the top layer is at least partly formed by an embossing operation, preferably by a mechanical embossing operation.

According to a further or another embodiment, said top layer comprises at least a decoration layer and a wear layer, wherein said wear layer is provided onto said decoration layer. According to some embodiments, the decoration layer is a thermoplastic decoration layer. Preferably, said thermoplastic decoration layer is a thermoplastic decorative film, said thermoplastic decoration layer comprising a print. According to some embodiments, the wear layer is a transparent and/or translucent thermoplastic wear layer. Preferably, said transparent and/or translucent thermoplastic wear layer is a thermoplastic film. According to some embodiments, said top layer comprises a lacquer layer, wherein said lacquer layer is provided onto said wear layer. The lacquer layer may provide the decorative panel with improved scratch resistance.

Even more by preference, the relief of the top layer is formed by embossing said lacquer layer together with said wear layer.

Additionally or alternatively, an additional lacquer layer may be present on top of the top coating. This additional lacquer layer may further improve scratch resistance and my aid in conserving the particular feel and/or visual appearance of the decorative panel.

According to a further or another embodiment, said substrate comprises a thermoplastic material. The thermoplastic material of the substrate may be chosen from the group of polypropylene (PP), polyethylene (PE), polyethylene terephthalate (PET), polyvinylchloride (PVC), or combinations thereof. By preference, said thermoplastic material is polyvinylchloride (PVC).

According to some embodiments, said substrate comprises more than 40% by weight of a filler material. By preference, said substrate comprises between 65 and 85% by weight of filler material. According to some embodiments, said filler material may be chosen from chalk and/or limestone.

According to some alternative embodiments, said substrate may be a wood-based substrate, such as Medium Density Fiberboard (MDF) or High Density Fiberboard (HDF), and said top layer may comprise a printed decorative paper and a wear layer which is made of a transparent material, preferably of a transparent synthetic material, such as melamine resin.

With the same aim as in the first independent aspect, the present invention, in accordance with a second independent aspect pertains to a method for manufacturing decorative panels, comprising the steps of:

- providing a substrate,
- providing a top layer onto said substrate,
- optionally providing said top layer with a relief on its uppermost surface, and
- providing a top coating onto said top layer,
- characterized in that, said top coating comprises a coating material and a texturizing agent.

It is clear that, according to the method of the second independent aspect, the term "providing" may indicate a plurality of possibilities and is not limiting in itself. For example, the substrate may be provided as a pre-formed, panel-shaped substrate layer, or alternatively may be formed newly by means of an extrusion or scattering operation. The top layer may be provided onto said substrate, for example by thermal lamination or gluing. The top layer may be provided with a relief on its uppermost surface, for example by mechanical or chemical embossing. The top coating may be provided onto the top layer by means of a liquid application such as roller coating, brushing or spraying, or by suitable alternative application means.

According to this second independent aspect of the present invention, decorative panels may be manufactured with a particular feel and/or visual appearance on their uppermost surface. Preferably, the texturizing agent in the top coating is combined with the relief in the top layer, which relief and texturizing agent in combination result in a particular feel and/or visual appearance of the uppermost surface of the decorative panels. It is a particular advantage of the herein disclosed method that, by combining a relief in the top layer, and a texturizing agent in the top coating, a very diverse range of structures may be obtained in a relatively straightforward and easy to apply manner. In particular, as a result, the uppermost surface of the resulting decorative panels may have a feel which corresponds to being dry, chalky, dusty, sandy, grainy, or a combination thereof. The method of the invention may thus allow manufacturing of decorative panels having a more authentic and/or more natural feel, especially with regard to decorative panels imitating materials such as natural stone, limestone, sandstone, concrete or cement.

In those embodiments wherein the top layer comprises a relief, said relief may be visible through the top coating. The surface of the top coating may itself be flat, wherein the relief of the top layer is visible through the top coating. Herein, the relief of the top layer may not contribute to the feel of the decorative panel, but may however contribute to a particular visual appearance. Alternatively, the top coating may follow the relief of the top layer, wherein the relief may thus contribute to both a particular feel as well as a particular visual appearance.

According to some alternative embodiments, to relief may be present on the uppermost surface of the top layer. Herein, only the texturizing agent contributes to the particular feel and/or visual appearance of the decorative panel.

In some embodiments, said texturizing agent forms a primary microrelief in the top coating. Although on the finally obtained decorative panel, the texturizing agent may be permanently fixed within the coating material, a particular dry, chalky, dusty, sandy or grainy feel may be obtained through the microrelief of the top coating, thereby creating the illusion that small particles are being released from the surface of the decorative panel. More in particular, the relief of the top layer and the primary microrelief of the top coating in combination may provide the decorative panel with a convincing feel which is similar to natural stone, limestone, sandstone, concrete or cement.

According to a further or another embodiment, said texturizing agent comprises a micro-granulate which has a median particle diameter D50 of between 1 and 30 μm.

It was found that using a micro-granulate with a median particle diameter D50 of between 1 and 30 μm was optimally suited to convincingly imitate the feeling of natural stone, limestone, sandstone, concrete or cement, thus substantially improving the perceived quality of the decorative panel. Herein, smaller diameters of for example 1 μm may be better suited create the illusion of finer materials, such as concrete or chalkstone, while larger diameters of for example 30 μm may be better suited to create the illusion of coarser materials, such as sandstone.

By preference, said micro-granulate has a median particle diameter D50 of between 1 and 20 μm. More by preference, said micro-granulate has a median particle diameter D50 of between 1 and 10 μm. Even more by preference, said micro-granulate has a median particle diameter D50 of between 1 and 5 μm, such as between 3 and 5 μm. With increasing preference, the diameter range as described herein may create the illusion that small particles are being released from the surface of the decorative panel.

According to a particular embodiment, said micro-granulate comprises a micronized polymer composition. Using a micronized polymer composition may have the advantage that the micro-granulate has an exceedingly accurate particle size distribution. By preference, said micronized polymer composition is chosen from the group of polypropylene wax, polyethylene wax, polytetrafluoroethylene-modified polyethylene wax (PTFE-modified polyethylene wax), modified high-density polyethylene wax (modified HD polyethylene wax), urea aldehyde resin, amide wax, polytetrafluoroethylene (PTFE), amide-modified polyethylene wax, polyester, or combinations thereof. More by preference, said micronized polymer composition is polypropylene wax.

According to a further or another embodiment, said coating material comprises a UV-curable lacquer. By preference, said UV-curable lacquer is a polyurethane acrylate (PU acrylate) based lacquer. It may also be possible that said coating material comprises one or more silane coupling agents. Herein, the silane coupling agents may improve fixation of the texturizing agent in the coating material, for example by means of cross-linking, and may thus aid in conserving the particular feel and/or visual appearance of the decorative panel.

According to some embodiments, said micro-granulate is present in an amount of between 1 and 10 vol % with respect to the top coating. More by preference, said micro-granulate is present in an amount of between 2 and 8 vol %, even more by preference of between 4 and 6 vol % with respect to the top coating.

According to some embodiments, said top coating is provided onto said top layer in an amount of between 10 and 20 $g/m^2$. By preference, said top coating is provided onto said top layer in an amount of between 12 and 18 $g/m^2$. More by preference, said top coating is provided onto said top layer in an amount of between 14 and 16 $g/m^2$.

According to some embodiments, said top coating has an average final thickness of between 10 and 50 μm. By preference, said top coating has an average final thickness of between 10 and 40 μm. More by preference, said top coating has an average final thickness of between 10 and 30 μm. Even more by preference, said top coating has an average final thickness of between 10 and 20 μm, such as between 10 and 15 μm.

According to a further or another embodiment, the relief of the top layer comprises a secondary microrelief, which secondary microrelief defines a plurality of texture elements, wherein the smallest sphere circumscribing one of said texture elements has an average diameter of between 5 and 100 μm. It is noted that, the average diameter of the smallest circumscribing sphere may be determined using confocal microscopy. More in particular, ISO 25178-2:2021 may be used to determine an array of surface texture parameters describe therein. The average diameter of the smallest circumscribing sphere may be measured and/or derived directly from the confocal microscopy images.

The combination of the secondary microrelief as described herein and the texturizing agent, which preferably defines the primary microrelief, may thus result in a further improvement of the particular feel and/or visual appearance of the uppermost surface of the decorative panel. More specifically, the uppermost surface of the decorative panel may have an improved feel which corresponds to being dry, chalky, dusty, sandy, grainy, or a combination thereof. Herein, the rougher structure of aforementioned materials may be largely obtained as a result of the relief, and the illusion that small particles are being released from the surface of the decorative panel may be largely obtained as a result of the texturizing agent.

By preference, the smallest sphere circumscribing one of said texture elements has an average diameter of between 5 and 75 μm. More by preference, the smallest sphere circumscribing one of said texture elements has an average diameter of between 5 and 50 μm. Even more by preference, the smallest sphere circumscribing one of said texture elements has an average diameter of between 5 and 25 μm, such as between 5 and 20 μm, or even such as between 10 and 15 μm.

According to some embodiments, the relief of the top layer may also define a macrorelief. Preferably, said macrorelief may correspond to the texture of a natural material such as natural stone or wood.

According to some embodiments, providing said top layer with relief on its uppermost surface is performed by means of an embossing operation, preferably by a mechanical embossing operation. Use may be made of an embossing roller which is shaped as such to provide a corresponding relief onto the top layer.

According to a further or another embodiment, said top layer comprises at least a decoration layer and a wear layer, wherein said wear layer is provided onto said decoration layer. According to some embodiments, the decoration layer is a thermoplastic decoration layer. Preferably, said thermoplastic decoration layer is a thermoplastic decorative film, said thermoplastic decoration layer comprising a print. According to some embodiments, the wear layer is a transparent and/or translucent thermoplastic wear layer. Preferably, said transparent and/or translucent thermoplastic wear layer is a thermoplastic film. According to some embodiments, said top layer comprises a lacquer layer, wherein said lacquer layer is provided onto said wear layer.

Even more by preference, the relief of the top layer is formed by embossing said lacquer layer together with said wear layer.

Additionally or alternatively, an additional lacquer layer may be provided on top of the top coating. This additional lacquer layer may further improve scratch resistance and my aid in conserving the particular feel and/or visual appearance of the decorative panel.

It is noted that said top coating can cover substantially or essentially the entire uppermost surface of said top layer, though this is not necessarily so. According to an alternative embodiment, said top coating covers only a portion of the uppermost surface. In such case, areas where said top coating has been applied may locally provide for said dusty feel, or for a different gloss or matt level. According to a first practical example, said top coating may be present mainly in one or more excavations provided in said uppermost surface or mainly on the uppermost surface with the exception of one or more excavations provided therein. According to a second practical example, said top coating may be present at least mainly on a portion of a lowered edge region adjacent to an upper edge of said decorative panel. The top coating applied to said lowered edge region may then be made to match the gloss level of the main uppermost surface.

Preferably, said top coating is translucent or transparent, such that e.g. an underlying decoration layer remains visible.

Using a translucent or transparent top coating in a lowered edge region of a decorative panel, for example as in said second practical example of the above alternative embodiment, per se forms an independent aspect of the present invention, i.e. independent for example of the presence of a texturizing agent in said top coating. Therefore, the present invention, in accordance with a particular independent aspect is a decorative panel comprising a substrate and a top layer, wherein said top layer optionally is provided with a main surface top coating and said decorative panel at at least one upper edge is provided with a lowered edge region, with as a characteristic that at least a portion of said lowered edge region is provided with a lowered edge top coating, wherein said lowered edge top coating is transparent or translucent. Preferably said main surface top coating has a degree of gloss of 10 or less, or 5 or less, or 2 or less as defined in DIN 67530. Preferably, said main surface top coating is a lacquer layer that has been cured at least by means of excimer radiation.

Preferably, said lowered edge region is, essentially is, or comprises a surface that is inclined downwardly in a distal direction towards the upper edge at a first angle, or first average angle. Preferably, said inclination is at a first angle or first average angle of 5 to 15° with respect to the horizontal, preferably about 11°.

Preferably, said lowered edge top coating has a degree of gloss matching the degree of gloss of the main surface of said decorative panel, e.g. matching the degree of gloss of the potentially present main surface top coating.

Preferably, said lowered edge top coating comprises a texturizing agent.

Preferably, said lowered edge top coating comprises silica or silicic acid. Said lowered edge top coating may comprises particles of silica, preferably amorphous silica and/or precipitated silica, preferably having a surface BET of 200 to 500 $m^2/g$ and/or a median particle size as defined by the D50 value of 3 to 10 μm; and/or said lowered edge top coating may comprise a wax based on polyethylene, polypropylene, carnauba, polytetrafluoroethylene or amide.

Preferably, said lowered edge top coating forms a top coating portion separate from said main surface top coating, and preferably overlaps a side edge of said main surface top coating.

Preferably, said top layer comprises a decoration layer and a wear layer, wherein said wear layer is provided onto said decoration layer. Said wear layer is preferably a thermoplastic wear layer. Said decoration layer may extend continuously from on the main surface at least up to and in said lowered edge region, and preferably up to said upper edge adjacent said lowered edge region. Preferably, said wear layer extends continuously from on the main surface at least up to and in said lowered edge region, and preferably up to said upper edge adjacent said lowered edge region.

Preferably, said main surface top coating, when available, is absent in at least a portion of said lowered edge region, wherein said portion is preferably provided with said lowered edge top coating.

Preferably, said lowered edge top coating comprises a coating material, preferably an acrylate based, such as a polyurethane acrylate based, lacquer.

Said lowered edge region may be formed by forming, e.g. by cutting, said lowered edge region at least in part, but preferably entirely, such that it extends in said wear layer, respectively preferably such that it extends wholly in said wear layer. Especially in the cases where said wear layer is thermoplastic, forming especially cutting, may lead to a rise in the gloss level in said lowered edge region where it extends in said wear layer. This is on the one hand due to the potential removal of the main surface top coating at the location of said lowered edge region, and one the other hand due to the forming, for example cutting, operation in said wear layer. Thermoplastic materials tend to be smoothened by contact. The present invention now provides for a solution that comprises providing said lowered edge top coating. As above mentioned said lowered edge top coating is preferably separate form said main surface top coating, but may match the gloss degree or matt level of said main surface top coating. The lowered edge top coating is preferably applied after the provision of said lowered edge region, for example by cutting. The lowered edge top coating may for example be applied with a vacuum application device, a transfer disk application, a transfer print application, or the like.

It is clear that the present invention also is a method for manufacturing decorative panels having the characteristics of said particular independent aspect and/or the preferred embodiments thereof, wherein said decorative panels comprise a substrate and a top layer, wherein said decorative panel at at least one upper edge is provided with a lowered edge region, said method comprising:

- providing a board or slab material comprising at least said substrate and said top layer of one or a plurality of said decorative panels;
- optionally the step of providing said board or slab material with a main surface top coating on said top layer, preferably at least by means of roller application of a coating material and/or preferably by hardening a coating material provided on said main surface by ultraviolet and/or excimer radiation;
- in the cases where said board or slab material comprises the substrate, the top layer and potentially the main surface top coating of a plurality of said decorative panels, the step of dividing said board or slab in a plurality of half fabricated panels, for example having about the dimensions of said decorative panels; in an alternative case said board or slab may have about the dimensions of one such decorative panel and form one half fabricated panel per se;
- the step of forming a lowered area adjacent to an upper edge of one or more of said half fabricated panels;
- the step of providing said lowered area with a lowered edge top coating, wherein said lowered edge top coating is preferably transparent or translucent. Preferably said lowered edge top coating is provided essentially exclusively in or on said lowered area;
- optionally the step of postprocessing said lowered edge top coating;
- wherein at least a portion of said lowered area that is provided with said lowered edge top coating is comprised in or forms said lowered edge region.

Preferably said main surface top coating, when available, has a degree of gloss of 10 or less, or 5 or less, or 2 or less as defined in DIN 67530. Preferably, said main surface top coating is a lacquer layer that has been cured at least by means of excimer radiation and/or at least by ultraviolet radiation.

Preferably said top layer comprises at least a decoration layer and a wear layer, wherein said wear layer is provided onto said decoration layer. Said wear layer is preferably a thermoplastic wear layer. Said decoration layer may extend continuously from on the main surface at least up to and in said lowered area or said lowered edge region, and preferably up to said upper edge adjacent said lowered edge region. Preferably, said wear layer extends continuously from on the main surface at least up to and in said lowered area or lowered edge region, and preferably up to said upper edge adjacent said lowered edge region.

Preferably said step of providing said lowered edge top coating comprises the application of a coating material by means of a vacuum application device, a transfer disk application, a transfer print application, a roller application device or the like.

Preferably said method comprises a step of profiling one or more of the edges of said half fabricated panels, for example wherein the applied profile comprises coupling means or coupling parts, allowing that two of such panels at the respective edges can be coupled to each other, wherein, in the coupled condition, a locking is obtained in a vertical direction perpendicular to the plane of coupled panels, and in a horizontal direction in the plane of coupled panels and perpendicular to said edges. Preferably said step of profiling comprises a mechanical milling operation with one or more rotating milling cutters. Said step of profiling may be executed at any time in the above method, preferably, however, at a time when said slab material, board material or half fabricated panels have about the final dimensions of the decorative panels.

Preferably, said step of forming a lowered area comprises removing a material portion from said top layer. In the case of a top layer comprising a wear layer and a decoration layer, said material portion is preferably completely positioned above said decoration layer, or, is, in other words, removed only from the material originally available on top of said decoration layer, for example only from said wear layer and a potential main surface top coating.

Preferably, said lowered edge region is, essentially is, or comprises a surface that is inclined downwardly in a distal direction towards the upper edge at a first angle, or average angle. Preferably, said inclination is at a first angle or first average angle of 5 to 15° with respect to the horizontal, preferably about 11°. Here below two practical examples are given for the geometry of the lowered edge region and the pertaining lowered area, without desiring to be exhaustive.

According to a first practical example, as seen in a cross-section perpendicular to said upper edge, said portion of said lowered area that is provided with said lowered edge top coating and is comprised in or forms said lowered edge region, is inclined downwardly in a distal direction towards the upper edge at a second angle or second average angle corresponding to or about corresponding to said first angle or said first average angle at which said surface of said lowered edge region is inclined. In other words, said lowered edge top coating has a uniform or about uniform thickness at the location of said portion.

According to a second practical example, as seen in a cross-section perpendicular to said upper edge, the geometry of said lowered area may deviate from the geometry of said surface of said lowered edge region. For example, said portion of said lowered area, that is provided with said lowered edge top coating and is comprised in or forms said lowered edge region, is horizontal or inclined in a distal direction towards the upper edge at a second angle or second average angle that is different from said first angle or said first average angle at which said surface of said lowered edge region is inclined. In other words, said lowered edge top coating has a varying thickness along said surface. The difference between said first angle, first average angle as the case may be, and said second angle, second average angle as the case may be, may be 5° or more.

Said optional step of postprocessing said lowered edge top coating may comprise a step of forming the final upper surface of the respective lowered edge region. For example, the lowered edge top coating may have been provided in an excessive manner on or in said lowered area, wherein the excess of material is scraped off, milled away or otherwise removed to form the final surface of said lowered edge region. Such optional step is especially relevant when said lowered edge top coating is to be applied to a shallow lowered area and/or in case of a lowered edge region extending with a limited downward inclination in said distal direction to the pertaining upper edge. For example, when said inclination has a first angle or average first angle of 15° or lower and/or when the maximum depth attained in said lowered edge region is less than 600 μm and/or when said lowered edge region extends exclusively in the material of said panel available on top of said decoration layer. In such cases, a more fluent manufacturing may be obtained as compared to a method wherein the lowered edge top coating is directly applied in the desired thickness or amount. This is even more so when a coating application method is applied for providing said lowered edge coating which an insufficient control of the applied coating material and/or when a transfer disk device or a vacuum application device is used.

In general it is remarked that as a vacuum application device, the device disclosed in DE 92 02 976 U1 may be used, and that as a transfer disk device, the devices disclosed in EP 1 812 172 may be used.

According to some embodiments of any of the above-mentioned aspects, said substrate is provided by means of extrusion.

According to a further or another embodiment, said substrate comprises a thermoplastic material. The thermoplastic material of the substrate may be chosen from the group of polypropylene (PP), polyethylene (PE), polyethylene terephthalate (PET), polyvinylchloride (PVC), or combinations thereof. By preference, said thermoplastic material is polyvinylchloride (PVC).

According to some embodiments, said substrate comprises more than 40% by weight of a filler material. By preference, said substrate comprises between 65 and 85% by weight of filler material. According to some embodiments, said filler material may be chosen from chalk and/or limestone.

In accordance with any of the aspects of the present invention the substrate may be single-layered or comprising a plurality of substrate layers, preferably an uneven number of substrate layers. The substrate, whether single-layered or multi-layered, preferably forms at least half the thickness and/or half the weight of said decorative panel and/or is at least available at a central location within the thickness of said decorative panel.

The decorative panel of the invention preferably has a total thickness between 2 and 8 mm, and even better between 3 and 6 mm. The substrate, whether multi-layered or single layered, preferably has a thickness between 2 mm and 5 mm.

It is clear that, in the context of the present invention, any panel portion indicated as a layer, for example a substrate layer, has a clearly distinct property form the layers adjacent to it. The distinct property may for example comprise a different material composition, a different color, a different geometry.

The decorative panel of any of the aspects mentioned above may be provided on at least two opposite edges with coupling parts, allowing that two such panels at the respective edges can be coupled to each other, wherein, in the coupled condition, a locking is obtained in a vertical direction perpendicular to the plane of coupled panels, and in a horizontal direction in the plane of coupled panels and perpendicular to said edges.

Preferably, the coupling parts are basically formed as a tongue and groove with locking means. For example such coupling parts as described in WO 97/47834. The coupling parts and locking means preferably show one or more of the following properties:

The property that said coupling parts and locking means are formed in one piece with the material of said decorative panel. Preferably the respective edge is formed for at least 70% of its contour, as seen in a cross-section in a plane perpendicular to said edge, out of said substrate, preferably out of said thermoplastic material, as the case may be.

The property that said groove has a lower and an upper groove lip, wherein the lower groove lip preferably extends beyond said upper groove lip. Preferably, said locking means comprise a protrusion formed on the upper side of said lower groove lip, and an excavation at the bottom of said tongue.

The property that the lower side of the upper groove lip and/or the upper side of the lower groove lip is entirely formed in said substrate. The lower side of the upper groove lip and/or the upper side of said lower groove lip are preferably entirely formed from said thermoplastic material, as the case may be.

The property that said substrate is a an extruded thermoplastic material, wherein said horizontal direction coincides with the extrusion direction, wherein said panel is rectangular and oblong, and said coupling parts are preferably available at the pair of longitudinal edges. As an alternative said coupling parts are available at the pair of short edges, and/or at both pairs of edges.

BRIEF DESCRIPTION OF THE DRAWINGS

In order to better demonstrate the features of the invention, some preferred embodiments are described below, by way of example and without any limiting character, with reference to the accompanying drawings, wherein.

DETAILED DESCRIPTION OF THE INVENTION

Figure 1:
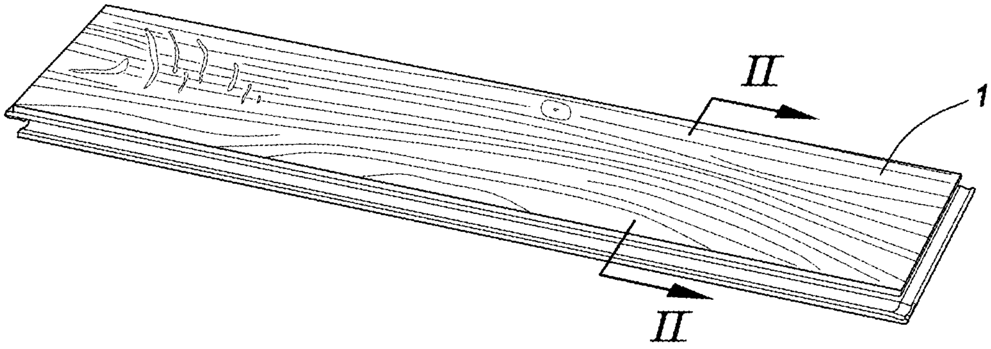
FIG. 1 illustrates a perspective view of a decorative panel in accordance with the first independent aspect of the invention.
Figure 2:
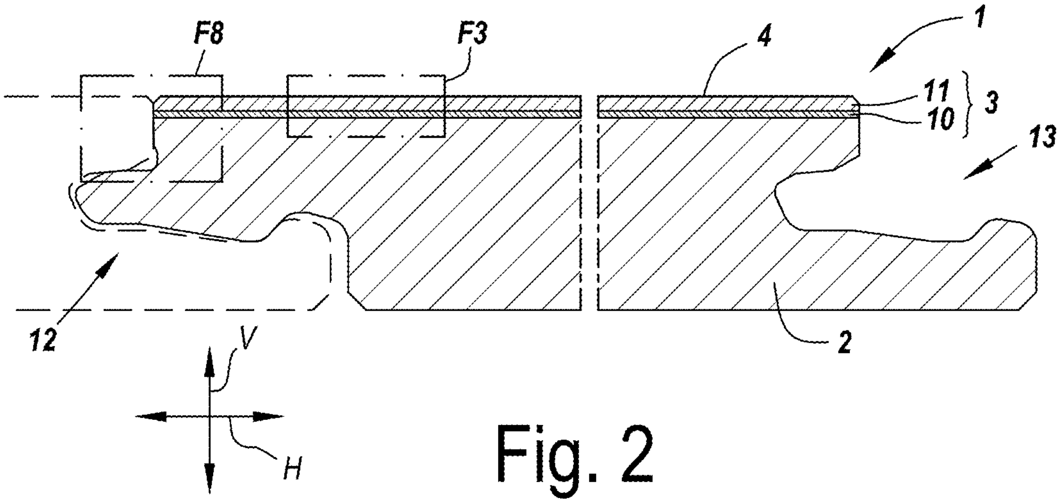
FIG. 2 illustrates a cross-sectional view according to line II-II in FIG. 1.
Figure 3:
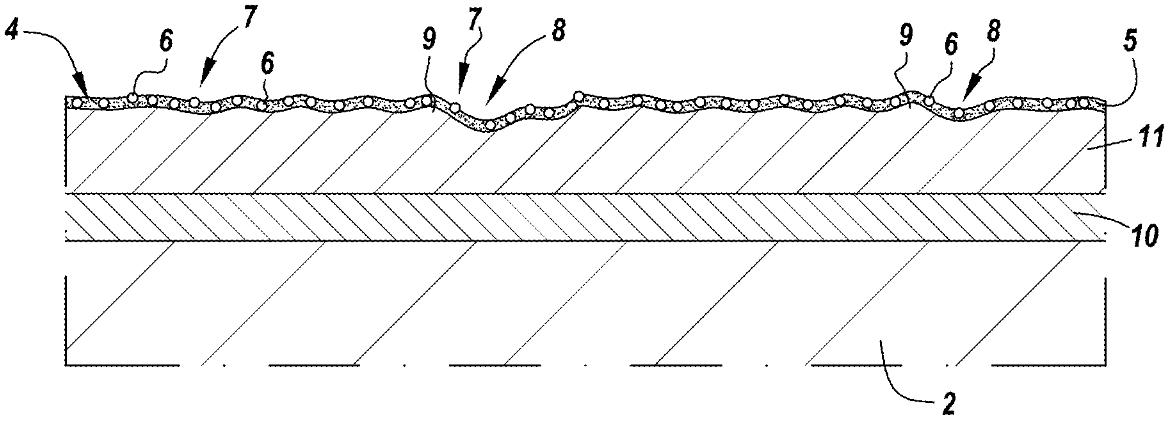
FIG. 3 illustrates a more detailed cross-sectional view according to F3 in FIG. 2.

FIGS. 1 and 2 show a decorative panel 1 according to the invention, in particular the first independent aspect of the invention, wherein said decorative panel 1 comprises a substrate 2, a top layer 3 and a top coating 4; and wherein the top layer 3 is located between said substrate 2 and said top coating 4. In FIG. 3, a detailed view of this layered buildup is shown. In particular, FIG. 3 shows that the top coating 4 of the decorative panel 1 comprises a coating material 5 and a texturizing agent 6. Said texturizing agent 6 forms a primary microrelief 7 in the top coating 4. The top layer 3 has a relief on its uppermost surface, which relief comprises a secondary microrelief 8, which secondary microrelief 8 defines a plurality of texture elements 9.

It is furthermore shown that the top layer 3 comprises a decoration layer 10 and a wear layer 11, wherein said wear layer 11 is provided onto said decoration layer 10. Although not explicitly shown, the top layer 3 may also comprise a separate lacquer layer which is provided onto the wear layer 11.

The decorative panel 1 is furthermore provided on at least two opposite edges with coupling parts, allowing that two such panels at the respective edges can be coupled to each other, wherein, in the coupled condition, a locking is obtained in a vertical direction V perpendicular to the plane of coupled panels, and in a horizontal direction H in the plane of coupled panels and perpendicular to said edges. More specifically, a tongue 12 and groove 13 configuration is shown.

FIG. 1 furthermore aims to illustrate that the top layer 3 is provided with a macrorelief which imitates a wood pattern.

In the decorative panel as illustrated, the texturizing agent 6 comprises a micro-granulate which has a median particle diameter D50 of between 1 and 30 μm, and which may concern a micronized polymer composition chosen from the group of polypropylene wax, polyethylene wax, polytetrafluoroethylene-modified polyethylene wax, modified high-density polyethylene wax, urea aldehyde resin, amide wax, polytetrafluoroethylene, amide-modified polyethylene wax, polyester, or combinations thereof. The coating material 5 comprises a UV-curable lacquer, preferably a polyurethane acrylate based lacquer. The top coating 4 as a whole may have an average thickness of between 10 and 50 μm. The secondary microrelief is defined by the texture elements 9, wherein the smallest sphere circumscribing one of said texture elements 9 has an average diameter of between 5 and 100 μm.

Figure 4:
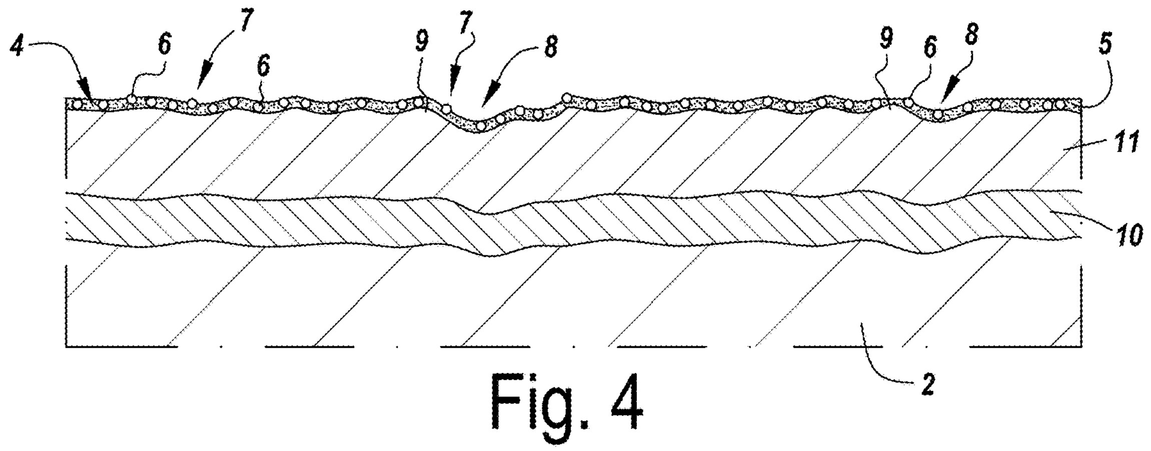
FIGS. 4 and 5 illustrate variants in the same view as in FIG. 3.
Figure 5:
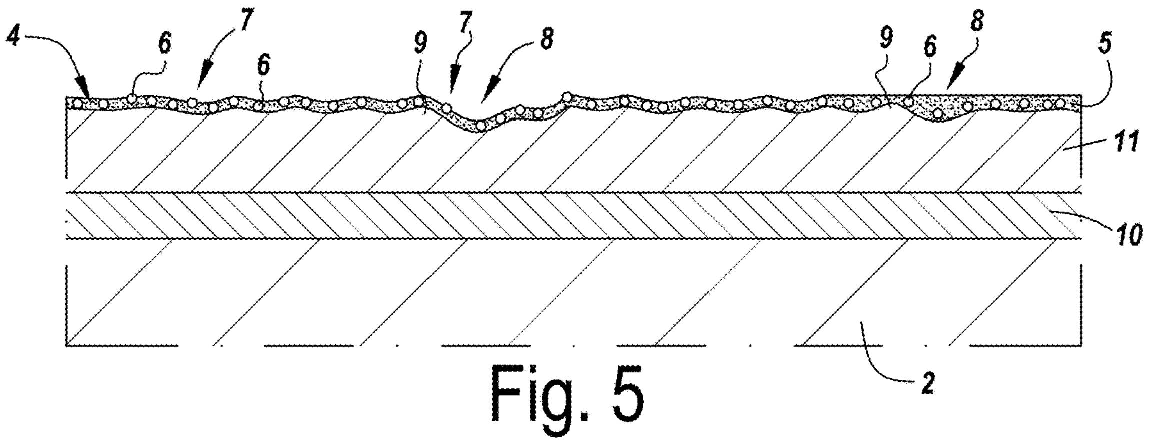

FIGS. 3, 4 and 5 all aim to illustrate several variants or alternatives. In particular, FIG. 3 shows an exemplary buildup of a decorative panel 1 according to the invention, wherein the relief of the top layer 3, in particular the secondary microrelief 8 and possibly the macrorelief, is limited to the wear layer 11 only. The micro-granulate of the texturizing agent 6 may be partly exposed onto the surface of the decorative panel 1, or may be completely encapsulated by the coating material 5. Either way, the top coating 4 more or less follows the relief of the top layer 3 such that the primary microrelief 7, the secondary microrelief 8 and possibly the macrorelief are perceivable on the uppermost surface of the decorative panel 1. In an alternative, FIG. 4 shows that the relief of the top layer 3, in particular the secondary microrelief 8 and possibly the macrorelief, is present as a deformation of the wear layer 11, of the decoration layer 10, and possibly even of the substrate 2. The top coating 4 more or less follows the relief of the top layer 3 such that the primary microrelief 7, the secondary microrelief 8 and possibly the macrorelief are perceivable on the uppermost surface of the decorative panel 1. In another alternative, FIG. 5 shows that the relief of the top layer 3, in particular the secondary microrelief 8 and possibly the macrorelief is limited to the wear layer 11 only. However, the micro-granulate of the texturizing agent 6 is not exposed onto the surface of the decorative panel 1 as the coating material 5 completely encapsulates the texturizing agent 6. Even more so, the coating material 5 evens out the relief as a whole, such that the uppermost surface of the decorative panel 1 is substantially flat.

Figure 6:
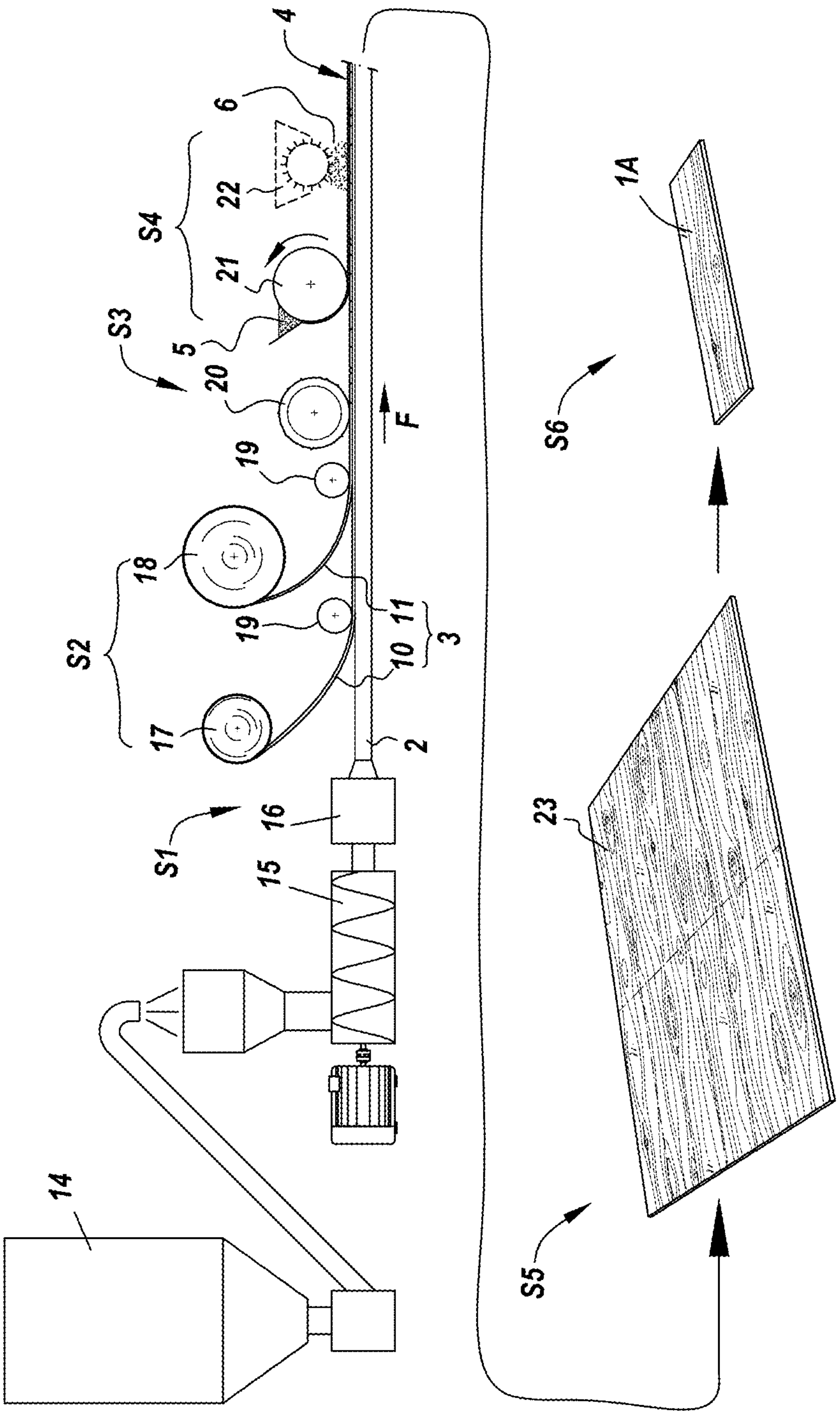
FIG. 6 schematically illustrates a method for manufacturing a decorative panel in accordance with the second independent aspect of the invention.

FIG. 6 schematically illustrates a method for manufacturing a decorative panel 1 in accordance with the second independent aspect of the invention, comprising: the step S1 of providing a substrate 2, the step S2 of providing a top layer 3 onto said substrate 2, the optional step S3 of providing said top layer 3 with a relief on its uppermost surface, and the step S4 of providing a top coating 4 onto said top layer 3, wherein the top coating 4 comprises a coating material 5 and a texturizing agent 6. The texturizing agent 6 is provided for it to form a primary microrelief 4 in the top coating 4. The top layer 3 has a relief on its uppermost surface, which relief comprises a secondary microrelief 8, which secondary microrelief 8 defines a plurality of texture elements 9. Providing said top layer 3 with relief on its uppermost surface is performed by means of a mechanical embossing operation with an embossing roller 20.

It is furthermore shown that the top layer 3 comprises a decoration layer 10 and a wear layer 11, wherein said wear layer 11 is provided onto said decoration layer 10. The decoration layer 10 and the wear layer 11 are provided from the respective supply rolls 17 and 18, and are laminated onto the substrate 2 by means of two lamination rollers 19. Alternatively, although not explicitly shown, the decoration layer 10 and the wear layer 11 may also be laminated together by means of a single lamination roller 19. Although not explicitly shown, the top layer 3 may also comprise a separate lacquer layer which may be provided onto the wear layer 11.

In the method as illustrated, the texturizing agent 6 comprises a micro-granulate which has a median particle diameter D50 of between 1 and 30 μm, and which may concern a micronized polymer composition chosen from the group of polypropylene wax, polyethylene wax, polytetrafluoroethylene-modified polyethylene wax, modified high-density polyethylene wax, urea aldehyde resin, amide wax, polytetrafluoroethylene, amide-modified polyethylene wax, polyester, or combinations thereof. The coating material 5 comprises a UV-curable lacquer, preferably a polyurethane acrylate based lacquer. The top coating 4 as a whole may have an average thickness of between 10 and 50 μm. The secondary microrelief is defined by the texture elements 9, wherein the smallest sphere circumscribing one of said texture elements 9 has an average diameter of between 5 and 100 μm. It may be that the coating material 5 and the texturizing agent 6 are provided together by means of a lick roller 21. Alternatively, it may also be that the coating material 5 and the texturizing agent 6 are provided separately. For example the coating material 5 may be provided by means of a lick roller 21 and the texturizing agent 6 may be scattered by means of an optional scattering device 22.

As is shown in FIG. 6, the step S1 of providing the substrate material 1 may be performed by an extrusion operation, which comprises a feed 14 for feeding raw material for the substrate material 2 to the extruder 15. The raw material is extruded through a so-called flat die or slot die 16 in to a flat substrate material, for example having a width of 1 to 2.1 meter, preferably about 1.3 meter and a thickness of 2 to 7 mm, by preference of 3 to 6 mm, more by preference of 3 to 5 mm, even more by preference of 3.5 to 4.5 mm. It is furthermore shown in FIG. 6 that the resulting material, in step S5, may be further divided into slabs 23 or boards comprising a plurality of decorative panels 1 and/or, in step S6, may be consequently divided into half fabricated decorative panels 1A. In a subsequent step, not illustrated here, these half fabricated decorative panels 1A may be further processed to obtain said decorative panels 1, for example by providing one or more edges thereof with coupling means or coupling parts, for example in the form of a tongue 12 and a groove 13 at a pair of opposite edges.

Figure 7:
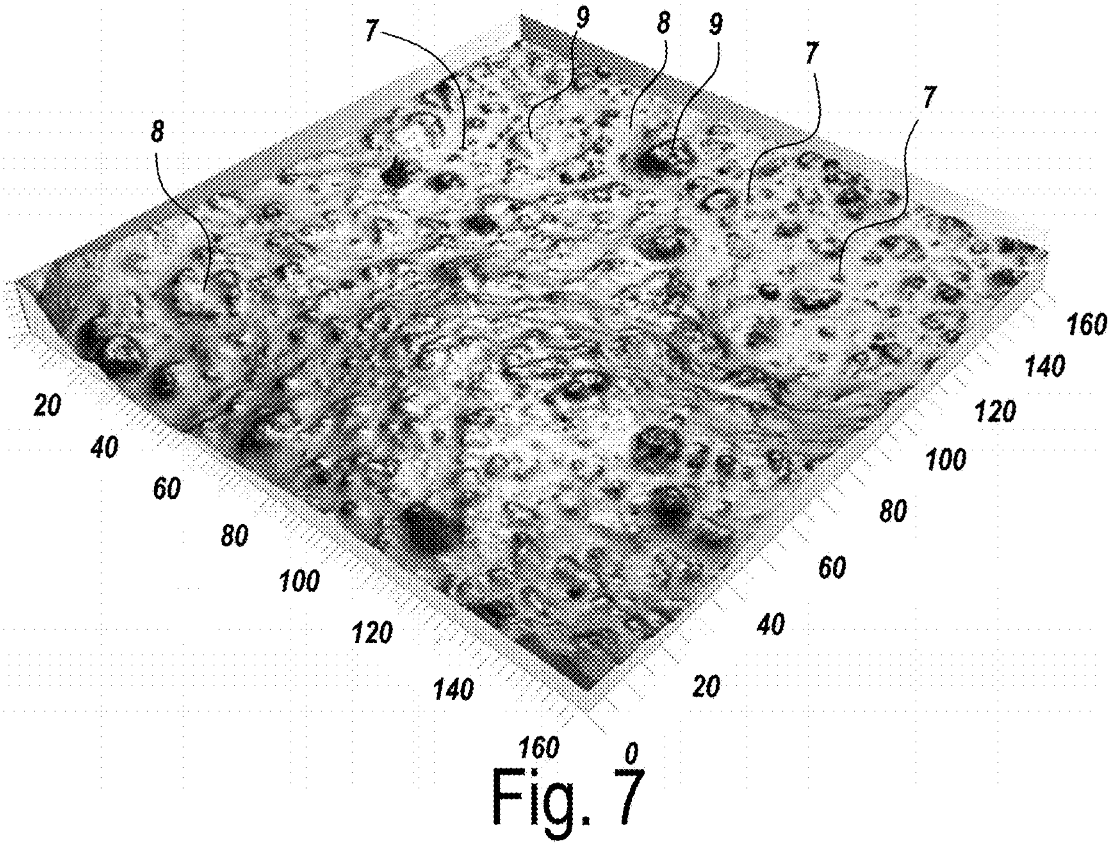
FIG. 7 shows a confocal microscopy image of the uppermost surface of a decorative panel in accordance with the first independent aspect of the invention.

FIG. 7 shows a confocal microscopy image of the uppermost surface of a decorative panel in accordance with the first independent aspect of the invention, as obtained in accordance with ISO 25178-2:2021. FIG. 7 thus aims to illustrate the uppermost surface of the decorative panel, which comprises regions with a primary microrelief 7, a secondary microrelief 8 and with texture elements 9. The values on both axes are given in micrometer.

Figure 8:
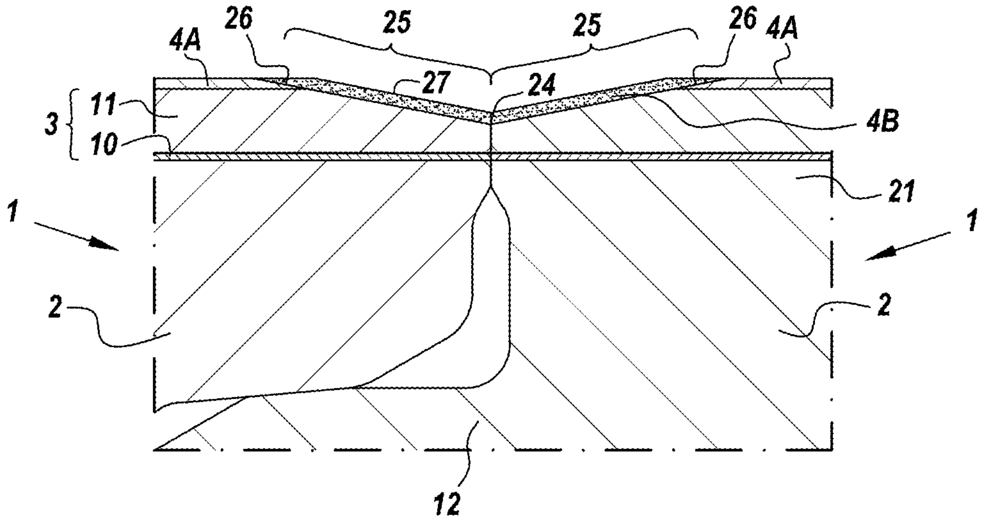
FIG. 8, at a larger scale, gives a view on the area indicated with F8 in FIG. 2, though for a variant.

FIG. 8 illustrates decorative panels 1, wherein said decorative panels 1, in accordance with the particular independent aspect of the invention, are provided at at least one upper edge 24 with a lowered edge region 25. The decorative panels 1 are shown in a coupled condition wherein said tongue 12 cooperates with said groove 13. The decorative panels 1 comprise a substrate 2 and a top layer 3. Said top layer 3 comprises a decoration layer 10 and a wear layer 11. A main surface top coating 4A is provided on said top layer 3. Said wear layer 11 is a thermoplastic wear layer, and said main surface top coating 4A is a radiation cured coating material, such as an acrylate coating material. The lowered edge region 25 is provided with a lowered edge top coating 4B that is transparent or translucent. And matches the degree of gloss of said main surface top coating 4A. The lowered edge top coating 4B may comprise a texturizing agent. The main surface top coating 4A is essentially absent in said lowered edge region 25. As shown the lowered edge top coating 4B forms a top coating portion separate from said main surface top coating 4A and overlaps a side edge 26 of said main surface top coating 4A.

The decoration layer 10 in the embodiment of FIG. 8 extends continuously from on the main surface at least up to and in said lowered edge region 25, and in this case up to said upper edge 24.

In the cases where said lowered edge top coating 4B comprises a coating material 5 and a texturizing agent 6, the embodiment of FIG. 8 also forms an example of the first independent aspect of the invention, where the top coating 4, in this case the lowered edge top coating 4B, covers only a portion of the uppermost surface of the decorative panel 1, namely a portion essentially being said lowered edge region 25.

Figure 9:
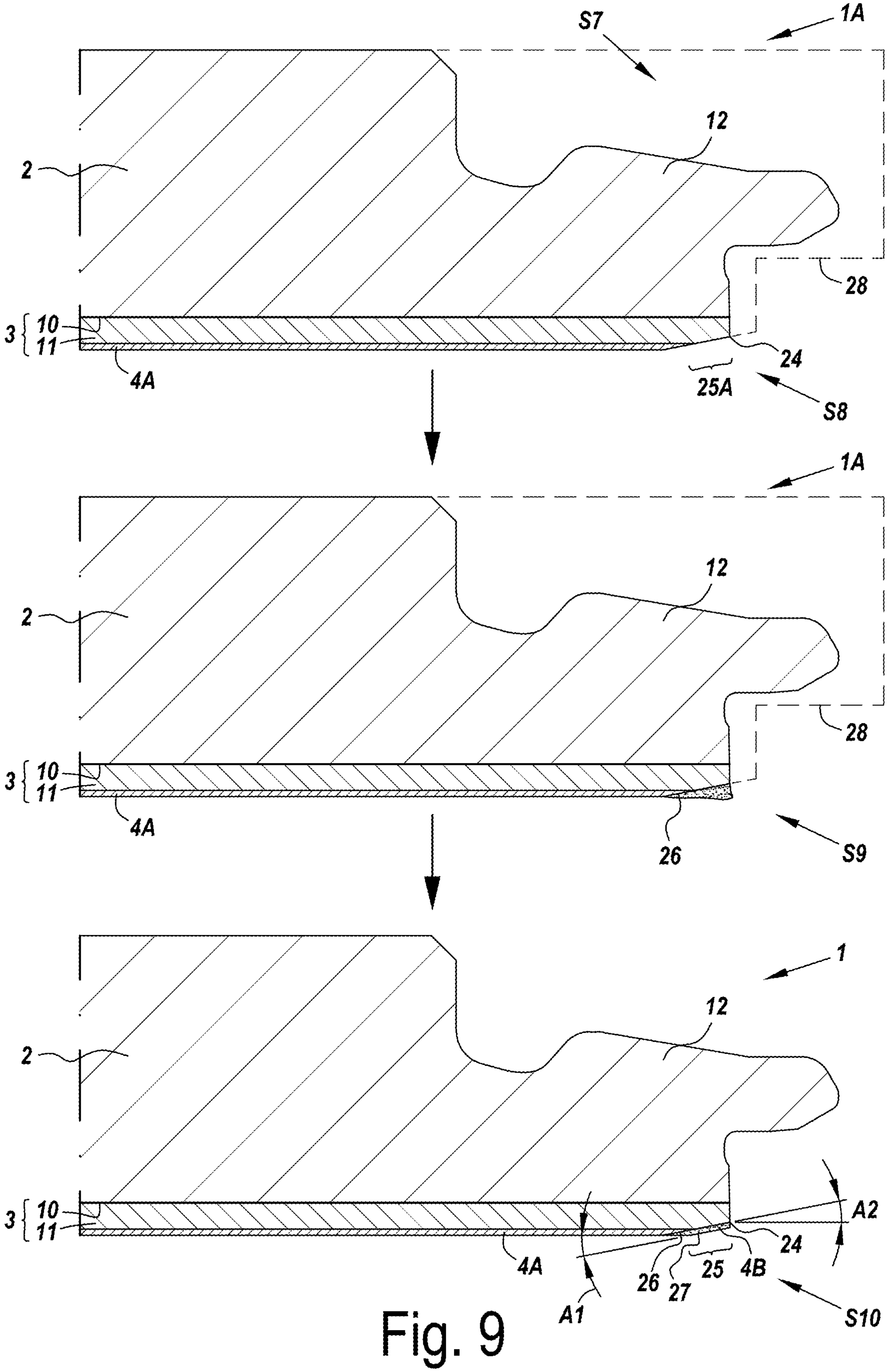
FIG. 9 illustrates some steps in a method for manufacturing the panel of FIG. 8.

FIG. 9 illustrates some steps in a method for manufacturing a decorative panel 1 having a lowered edge region 25 with a lowered edge top coating 4B provided thereon. These steps may follow the method illustrated by means of FIG. 6, in that the half fabricated panels 1A may be formed by providing a board or slab material 23 comprising at least the substrate 2 and the top layer 3 of a plurality of said decorative panels 1, wherein a main surface top coating 4 is provided on said top layer 3 and subsequently said board or slab material 23 is divided in a plurality of half fabricated panels 1A, having about the dimensions of said decorative panels 1.

As shown in FIG. 9, said method comprises a step S7 of profiling at least an edge of said half fabricated panels 1A, wherein the applied profile comprises coupling means. In this case an edge having a profile in the form of a tongue 12 is illustrated. It is clear that at the edge opposite thereto a profile comprise a complimentary groove 13 as shown in FIG. 2 may be provided.

It is noted that the half fabricated panels 1A are shown in FIG. 9 with their decorative side comprising said decoration layer 10 facing downwards, as this is a conventional manner of machining, more particularly milling, profiles in a so-called double end tenoner.

FIG. 9 also shows that in a step S8 a lowered area 25A may be formed adjacent to an upper edge 24.

In a step S9 said lowered area 25A is provided with a lowered edge top coating 4B essentially exclusively in said lowered area. It is illustrated that, in this case, an excessive amount of coating material is applied to said lowered area 25A. In the step S10 the excess of coating material is removed to form the final surface 27 of the lowered edge region 25.

In dashed lines 28, it is illustrated that the profile at the respective edge does not need to be formed completely before the step S8 and/or S9 and/or S10 are completed. The step S7 of profiling the edge to form the coupling parts can take place at any time during said method.

FIG. 9 also forms an example of the first practical example for the geometry of the lowered edge region 25 and the pertaining lowered area 25A mentioned in the introduction. Herein, the portion of the lowered area 25A that is provided with said lowered edge top coating 4B is inclined downwardly in a distal direction towards the upper edge at a second angle A2 with the horizontal that corresponds to the angle A1 at which said final surface 27 of the lowered edge region 25 extends. The thickness of the lowered edge top coating 4B is about uniform over the entire lowered edge region 25.

Figure 10:
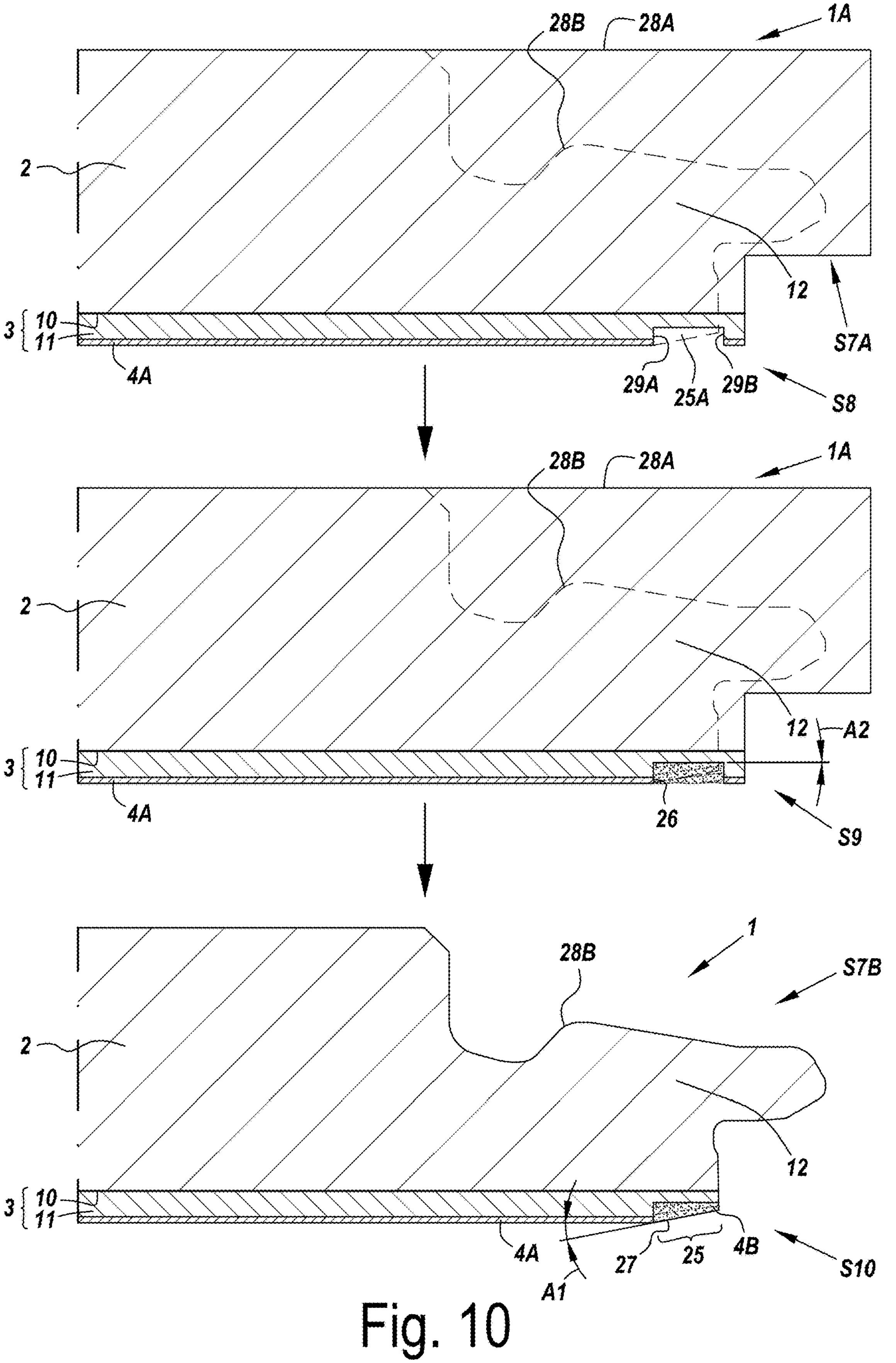
FIG. 10 in a same view as FIG. 9 illustrates a variant for said method.

FIG. 10 illustrate a variant of the method illustrated in FIG. 9, herein the half fabricated panels 1A are, in a step S7A, provided with an intermediary profile 28A deviating from the final profile 28B comprising the coupling parts, in this case the tongue 12. The final profile 28B is reached in a later step S7B. In a step S8 a lowered area 25A is formed and provided with an excess of coating material in a step S9. The excessive amount of coating material is removed in a step S10.

In the case of FIG. 10 an illustration of the second practical example for the geometry of said lowered edge region 25 and the pertaining lowered area 25A is obtained. Herein, the portion of the lowered area 25A that is provided with said lowered edge top coating 4B is horizontal, or extending at an angle A2 lower than 2°. The angle A2 is different from the angle A1 at which said final surface 27 of the lowered edge region 25 extends. The thickness of the lowered edge top coating 4B is varying along the lowered edge region 25.

In FIG. 10, the lowered area 25A is formed with a retaining wall 29A in a proximal direction and a retaining wall 29B in a distal direction. The retaining walls 29A-29B, in this case, extend substantially vertically.

With respect to FIGS. 8, 9 and 10 it is further noted that the lowered edge regions 25 or lowered areas 25A illustrated there preferably extend the entire length of the respective side edge, for example the longitudinal edge having the tongue 12. It is further clear that a same or similar lowered edge region 25 or lowered area 25A may be available at the opposite side edge having the groove 13. Also one or both of the short side edges may be provided with a lowered edge region or a pertaining lowered area, as illustrated in FIGS. 9 and 10. Potential coupling parts provided at said short side edges may be the same or similar as the tongue 12 and groove 13 illustrated in FIG. 2. Preferably, the coupling parts at said short side edges at least allow obtaining a locking between the respective side edges in a horizontal direction in the plane of coupled panels and perpendicular to said side edges, and in a vertical direction perpendicular to said plane.

The present disclosure further relates to the embodiments as defined in the below numbered paragraphs.

1.—Decorative panel comprising a substrate 2, a top layer 3 and a top coating 4, wherein said top layer is located between said substrate and said top coating, and wherein the uppermost surface of the top layer comprises a relief, characterized in that, said top coating comprises a coating material 5 and a texturizing agent 6.

2.—Decorative panel according to numbered paragraph 1, characterized in that, said texturizing agent 6 forms a primary microrelief 7 in the top coating 4.

3.—Decorative panel according to numbered paragraph 1 or 2, characterized in that, said texturizing agent 6 comprises a micro-granulate which has a median particle diameter D50 of between 1 and 30 μm.

4.—Decorative panel according to numbered paragraph 3, characterized in that, said micro-granulate comprises a micronized polymer composition.

5.—Decorative panel according to numbered paragraph 4, characterized in that, said micronized polymer composition is chosen from the group of polypropylene wax, polyethylene wax, polytetrafluoroethylene-modified polyethylene wax, modified high-density polyethylene wax, urea aldehyde resin, amide wax, polytetrafluoroethylene, amide-modified polyethylene wax, polyester, or combinations thereof.

6.—Decorative panel according to any one of preceding numbered paragraphs 1-5, characterized in that, said coating material 5 comprises a UV-curable lacquer, preferably a polyurethane acrylate based lacquer.

7.—Decorative panel according to any one of preceding numbered paragraphs 1-6, characterized in that, said top coating 4 has an average thickness of between 10 and 50 μm.

8.—Decorative panel according to any one of preceding numbered paragraphs 1-7, characterized in that, the relief of the top layer 3 comprises a secondary microrelief 8, which secondary microrelief defines a plurality of texture elements 9, wherein the smallest sphere circumscribing one of said texture elements has an average diameter of between 5 and 100 μm.

9.—Decorative panel according to any one of preceding numbered paragraphs 1-8, characterized in that, the relief of the top layer 3 is at least partly formed by an embossing operation, preferably by a mechanical embossing operation.

10.—Decorative panel according to any one of preceding numbered paragraphs 1-9, characterized in that, said top layer 3 comprises at least a decoration layer 10 and a wear layer 11, wherein said wear layer is provided onto said decoration layer.

11.—Decorative panel according to numbered paragraph 10, characterized in that, said top layer 3 comprises a lacquer layer, wherein said lacquer layer is provided onto said wear layer 11.

12.—Decorative panel according to numbered paragraph 11, characterized in that, the relief of the top layer 3 is formed by embossing said lacquer layer together with said wear layer 11.

13.—Decorative panel according to any one of preceding numbered paragraphs 1-12, characterized in that, said substrate 2 comprises a thermoplastic material, preferably polyvinylchloride.

14.—Decorative panel according to numbered paragraph 13, characterized in that, said substrate 2 comprises more than 40% by weight of a filler material, preferably between 65 and 85% by weight.

15.—Method for manufacturing decorative panels, comprising:

the step S1 of providing a substrate 2, the step S2 of providing a top layer 3 onto said substrate, the optional step S3 of providing said top layer with a relief on its uppermost surface, and the step S4 of providing a top coating 4 onto said top layer, characterized in that, said top coating comprises a coating material 5 and a texturizing agent 6.

16.—Method according to numbered paragraph 15, characterized in that, said texturizing agent 6 forms a primary microrelief 7 in the top coating 4.

17.—Method according to numbered paragraph 16, characterized in that, said texturizing agent 6 comprises a micro-granulate which has a median particle diameter D50 of between 1 and 30 μm.

18.—Method according to numbered paragraph 17, characterized in that, said micro-granulate comprises a micronized polymer composition.

19.—Method according to numbered paragraph 18, characterized in that, said micronized polymer composition is chosen from the group of polypropylene wax, polyethylene wax, polytetrafluoroethylene-modified polyethylene wax, modified high-density polyethylene wax, urea aldehyde resin, amide wax, polytetrafluoroethylene, amide-modified polyethylene wax, polyester, or combinations thereof.

20.—Method according to any one of numbered paragraphs 15-19, characterized in that, said coating material 5 comprises a UV-curable lacquer, preferably a polyurethane acrylate based lacquer.

21.—Method according to any one of numbered paragraphs 15-20, characterized in that, said top coating 4 is provided onto said top layer 3 in an amount of between 10 and 20 $g/m^2$.

22.—Method according to any one of numbered paragraphs 15-21, characterized in that, said top coating 4 has an average final thickness of between 10 and 50 μm.

23.—Method according to any one of preceding numbered paragraphs 15-22, characterized in that, said relief of the top layer 3 comprises a secondary microrelief 8, which secondary microrelief defines a plurality of texture elements 9, wherein the smallest sphere circumscribing one of said texture elements has an average diameter of between 5 and 100 μm.

24.—Method according to any one of numbered paragraphs 15-23, characterized in that, providing said top layer 3 with relief on its uppermost surface is performed by means of an embossing operation, preferably by a mechanical embossing operation.

25.—Method according to any one of numbered paragraph 15-24, characterized in that, said top layer 3 comprises at least a decoration layer 10 and a wear layer 11, wherein said wear layer is provided onto said decoration layer.

26.—Method according to numbered paragraph 25, characterized in that, said top layer 3 comprises a lacquer layer, wherein said lacquer layer is provided onto said wear 11 layer.

27.—Method according to numbered paragraph 26, characterized in that, the relief of the top layer 3 is formed by embossing said lacquer layer together with said wear layer 11.

28.—Method according to any one of preceding numbered paragraphs 15-27, characterized in that, said substrate 2 is provided by means of extrusion.

29.—Method according to any one of preceding numbered paragraphs 15-28, characterized in that, said substrate 2 comprises a thermoplastic material, preferably polyvinylchloride (PVC).

30.—Method according to numbered paragraph 29, characterized in that, said substrate 2 comprises more than 40% by weight of a filler material, preferably between 65 and 85%.

31.—Decorative panel comprising a substrate 2 and a top layer 3, wherein said top layer 3 optionally is provided with a main surface top coating 4A provided thereon and said decorative panel 1 at at least one upper edge 24 is provided with a lowered edge region 25, characterized in that at least a portion of said lowered edge region 25 is provided with a lowered edge top coating 4B, wherein said lowered edge top coating 4B is transparent or translucent.

32.—Decorative panel according to numbered paragraph 31, characterized in that said main surface top coating 4A has a degree of gloss of 10 or less, or 5 or less, as defined in DIN 67530.

33.—Decorative panel according to numbered paragraph 31 or 32, characterized in that said main surface top coating 4A is a lacquer layer that has been cured at least by means of excimer radiation.

34.—Decorative panel according to any of numbered paragraphs 31 to 33, characterized in that said lowered edge top coating 4B has a degree of gloss matching the degree of gloss of the main surface of said decorative panel, e.g. matching the degree of gloss of the potentially present main surface top coating 4A.

35.—Decorative panel according to any of numbered paragraphs 31 to 34, characterized in that said lowered edge top coating 4B comprises a texturizing agent 6.

36.—Decorative panel according to any of numbered paragraphs 31 to 35, characterized in that said lowered edge top coating 4B comprises silica or silicic acid.

37.—Decorative panel according to numbered paragraph 36, characterized in that said lowered edge top coating 4B comprises particles of silica, preferably amorphous silica and/or precipitated silica, preferably having a surface BET of 200 to 500 $m^2/g$ and/or a median particle size as defined by the D50 value of 3 to 10 μm; and/or said lowered edge top coating 4B comprises a wax based on polyethylene, polypropylene, carnauba, polytetrafluoroethylene or amide.

38.—Decorative panel according to any of numbered paragraphs 31 to 37, characterized in that said lowered edge top coating 4B forms a top coating portion separate from said main surface top coating 4A, and preferably overlaps a side edge 26 of said main surface top coating 4A.

39.—Decorative panel according to any of numbered paragraphs 31 to 38, characterized in that said top layer comprises a decoration layer 10 and a wear layer 11, wherein said wear layer 11 is provided onto said decoration layer 10.

40.—Decorative panel according to numbered paragraph 39, characterized in that said wear layer 11 is a thermoplastic wear layer.

41.—Decorative panel according to numbered paragraph 39 or 40, characterized in that said decoration layer 10 extends continuously from on the main surface at least up to and in said lowered edge region 25, and preferably up to said upper edge 24.

42.—Decorative panel according to numbered paragraph 41, characterized in that said wear layer 11 extends continuously from on the main surface at least up to and in said lowered edge region 25, and preferably up to said upper edge 24.

43.—Decorative panel according to any of the numbered paragraphs 31 to 42, characterized in that said main surface top coating 4A, when available, is absent in at least a portion of said lowered edge region 25, wherein said portion is preferably provided with said lowered edge top coating 4B.

44.—Decorative panel according to any of the numbered paragraphs 31 to 43, characterized in that said lowered edge top coating 4B comprises a coating material, preferably an acrylate based, such as a polyurethane acrylate based, lacquer.

45.—Method for manufacturing decorative panels preferably in accordance with any of the numbered paragraphs 31 to 44, wherein said decorative panels 1 comprise a substrate 2 and a top layer 3, wherein said decorative panel 1 at at least one upper edge 24 is provided with a lowered edge region 25, said method comprising:

providing a board or slab material 23 comprising at least said substrate 2 and said top layer 3 of one or a plurality of said decorative panels 1;

optionally the step of providing said board or slab material with a main surface top coating 4A on said top layer 3, preferably at least by means of roller application of a coating material and/or preferably by hardening a coating material provided on said main surface by ultraviolet and/or excimer radiation;

in the cases where said board or slab material 23 comprises the substrate 2, the top layer 3 and potentially the main surface top coating 4*a* of a plurality of said decorative panels 1, the step S6 of dividing said board or slab in a plurality of half fabricated panels 1A, for example having about the dimensions of said decorative panels 1; in an alternative case said board or slab 23 may have about the dimensions of one such decorative panel 1 and form one half fabricated panel 1A per se;

the step S8 of forming a lowered area 25A adjacent to an upper edge 24 of one or more of said half fabricated panels 1A;

the step S9 of providing said lowered area 25A with a lowered edge top coating 4B, wherein said lowered edge top coating 4B is preferably transparent or translucent, wherein preferably said lowered edge top coating 4A is provided essentially exclusively in or on said lowered area 25A;

optionally the step S10 of postprocessing said lowered edge top coating 4B;

wherein at least a portion of said lowered area 25A that is provided with said lowered edge top coating 4B is comprised in or forms said lowered edge region 25.

46.—Method according to numbered paragraph 45, characterized in that said main surface top coating 4A, when available, has a degree of gloss of 10 or less, or 5 or less, or 2 or less as defined in DIN 67530. Preferably, said main surface top coating 4A is obtained by hardening a lacquer layer at least by means of excimer radiation and/or at least by ultraviolet radiation.

47.—Method according to numbered paragraphs 45 or 46, characterized in that said top layer 3 comprises at least a decoration layer 10 and a wear layer 11, wherein said wear layer 11 is provided onto said decoration layer 10. Said wear layer 11 is preferably a thermoplastic wear layer. Said decoration layer 10 may extend continuously from on the main surface at least up to and in said lowered edge region 25, and preferably up to said upper edge 24 adjacent said lowered edge region 25. Preferably, said wear layer 11 extends continuously from on the main surface at least up to and in said lowered edge region 25, and preferably up to said upper edge 24 adjacent said lowered edge region 25.

48.—Method according to any of numbered paragraphs 45 to 47, Preferably said step S9 of providing said lowered edge top coating 4B comprises the application of a coating material by means of a vacuum application device, a transfer disk application, a transfer print application and/or a roller application device.

49.—Method according to any of numbered paragraphs 45 to 48, characterized in that said method comprises a step S7-S7A-S7B of profiling one or more of the edges of said half fabricated panels 1A, for example wherein the applied profile comprises coupling means or coupling parts, allowing that two of such panels at the respective edges can be coupled to each other, wherein, in the coupled condition, a locking is obtained in a vertical direction perpendicular to the plane of coupled panels, and in a horizontal direction in the plane of coupled panels and perpendicular to said edges. Preferably said step S7-S7A-S7B of profiling comprises a mechanical milling operation with one or more rotating milling cutters. Said step S7-S7A-S7B of profiling may be executed at any time in the above method, preferably, however, at a time when said slab material, board material 23 or half fabricated panels 1A have about the final dimensions of the decorative panels 1.

50.—Method according to any of numbered paragraphs 45 to 49, characterized in that said step S8 of forming a lowered area 25A comprises removing a material portion from said top layer 3.

51.—Method according to any of numbered paragraphs 45 to 50, characterized in that said optional step S10 of postprocessing said lowered edge top coating 4B may comprise a step of forming the final upper surface 27 of the respective lowered edge region 25.

The aspects and concepts disclosed in the claims and drawings may be combined with one another as long as they are not mutually contradictory. The present invention is by no means limited to the embodiments described above, however decorative panels may be realized according to various variants without departing from the scope of the present invention.

The invention claimed is:

1. A decorative panel having a top surface consisting of a main surface and edge regions adjacent to edges of said top surface, said decorative panel comprising;

a substrate and a top layer;

wherein the top layer comprises a decoration layer and a wear layer, the wear layer is a thermoplastic wear layer provided onto the decoration layer;

wherein said top layer is provided with a main surface top coating provided thereon at said main surface, and at least one of the edge regions is defined as with a lowered edge region lowering to an edge of the edges of the top surface relative to the main surface;

wherein the decoration layer and the wear layer extend continuously from the main surface at least up to and in the lowered edge region, and up to the edge of the top surface adjacent to said lowered edge region, wherein the main surface top coating is absent in at least a portion of the lowered edge region;

wherein at least a portion of said lowered edge region is provided with a lowered edge top coating forming a top coating portion separate from the main surface top coating;

wherein said lowered edge top coating is transparent or translucent, and the lowered edge top coating comprises particles of silica having a surface BET of 200 to 500 $m^2/g$, silicic acid or a wax based on polyethylene, polypropylene, carnauba, polytetrafluoroethylene, or amide;

wherein said lowered edge top coating has a degree of gloss matching the degree of gloss of the main surface top coating.

2. The decorative panel of claim 1, wherein said main surface top coating has a degree of gloss of 10 or less, as defined in DIN 67530.

3. The decorative panel of claim 1, wherein said main surface top coating is a lacquer layer that has been cured at least by means of excimer radiation.

4. The decorative panel of claim 1, wherein said lowered edge region is a surface that is inclined downwardly in a distal direction towards the upper edge at a first average angle 5 to 15°.

5. The decorative panel of claim 1, wherein said lowered edge top coating comprises a texturizing agent.

6. The decorative panel of claim 1, wherein said lowered edge region extends wholly in the wear layer.

7. The decorative panel of claim 1, wherein said lowered edge top coating comprises particles of amorphous silica and/or precipitated silica, having a surface BET of 200 to 500 $m^2/g$ and/or a median particle size as defined by a D50 value of 3 to 10 μm.

8. The decorative panel of claim 1, wherein said lowered edge top coating overlaps a side edge of said main surface top coating.

9. The decorative panel of claim 1, wherein the lowered edge top coating has a uniform or about uniform thickness at a location of the portion of said lowered edge region.

10. The decorative panel of claim 1, wherein said substrate comprises a thermoplastic material selected from a group of polypropylene, polyethylene, polyethylene terephthalate, and polyvinyl chloride.

11. The decorative panel of claim 1, wherein substrate comprises more than 40% by weight of a filler material.

12. The decorative panel of claim 1, wherein said lowered edge top coating comprises a coating material, including an acrylate based lacquer.

13. A method for manufacturing decorative panels according to claim 1, said decorative panels having a top surface consisting of a main surface and edge regions adjacent to the edges of said top surface, wherein said decorative panels comprise a substrate and a top layer, wherein at least one edge region is defined as a lowered edge region lowering to the edge of the top surface relative to the main surface, said method comprising:

providing a board or slab material comprising at least said substrate and said top layer of one or a plurality of said decorative panels;

the step of providing said board or slab material with a main surface top coating on said top layer, at least by means of roller application of a coating material and/or by hardening a coating material provided on said main surface by ultraviolet and/or excimer radiation;

the step of dividing said board or slab in a plurality of half fabricated panels, having dimensions of said decorative panels;

the step of forming a lowered area adjacent to an upper edge of one or more of said half fabricated panels, comprising removing a material portion from said top layer, said material portion being completely positioned above said decoration laver;

the step of providing said lowered area with a lowered edge top coating, wherein said lowered edge top coating is transparent or translucent, wherein said lowered edge top coating is provided essentially exclusively in or on said lowered area;

wherein said lowered edge top coating is transparent or translucent, and the lowered edge top coating comprises particles of silica having a surface BET of 200 to 500 $m^2/g$, silicic acid or a wax based on polyethylene, polypropylene, carnauba, polytetrafluoroethylene, or amide:

optionally the step of postprocessing said lowered edge top coating;

wherein at least a portion of said lowered area that is provided with said lowered edge top coating is comprised in or forms said lowered edge region.

* * * * *